MULTIPLE GAP ELECTRICAL DISCHARGE MACHINING CIRCUIT
Filed June 25, 1971
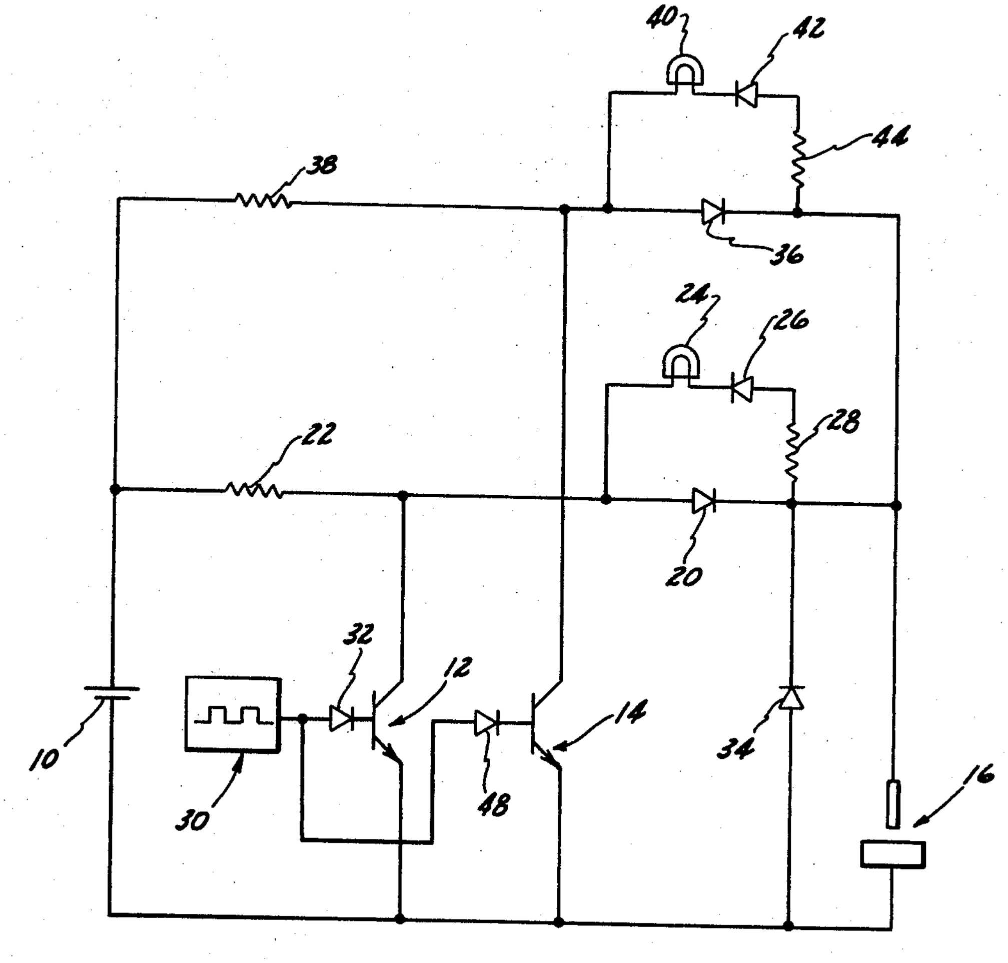
INVENTOR
DALTON R. VERNER
BY
Hauke Gifford & Patalidis
Attorneys 3,705,968
MULTIPLE GAP ELECTRICAL DISCHARGE MACHINING CIRCUIT Dalton R. Verner, Orchard Lake, Mich., assignor to Elox Inc., Davidson, N.C.
Filed June 25, 1971, Ser. No. 156,899
Int. Cl. B23p 1/08
U.S. Cl. 219—69 S 4 Claims

ABSTRACT OF THE DISCLOSURE

The circuit includes an arrangement for providing electrical discharge machining across one or more gaps with power pulses derived from a common power supply. Each machining gap includes an electronic switch and has associated with it a shunt diode of blocking polarity to prevent gap inductance from breaking down the associated switch. When several electronic switching means are used, they are each connected through an isolating diode to a common pulse generator or triggering means for turning them on and off at the same time. Also included in each gap circuit is a series diode of a polarity to pass power pulses to the gap with a detector means connected across the series diode for providing an indication of component failure in the associated gap circuit when several switches are connected in parallel.

BACKGROUND OF THE INVENTION

Prior art circuits are known for providing electrical discharge machining pulses from a common DC power supply or a plurality of DC power supplies to a plurality of gaps at the same time. One example of such a multiple gap power supply circuit is shown in Victor E. Matulaitus U.S. Pat. 2,783,411, issued on Feb. 26, 1957, for "Servo Feed for Multiple Electrodes," which patent is of common ownership with the present application. One problem encountered in multiple switch circuits in that one electronic switch may fail. This gives rise to the necessity for turning off all the gap circuits until the faulty component can be located and corrected. The problem is to provide a reliable indication of failure as soon as one of the electronic switches has failed, usually in a shorted condition, and to isolate the failed component and identify it, while continuing the operation of the remaining switches.

Prior art circuits of this type also have earlier disclosed the use of a blocking polarity series diode to prevent reverse firing across the gap. Failure of the diode thus connected in series is common because of the magnitude of the electrical energy switched through the gap inductance. It has been found possible to overcome this problem through the addition of a shunt diode and its connection relative to the gap as will be explained hereinafter.

While the present invention is illustrated by an embodiment incorporating electronic switches of the transistor or solid state type, the invention is not limited to the use of this particular switch type. The circuit of the invention is readily adaptable to the use of any electronic switch. By "electronic switch," I mean any electronic control device having two or more electrodes comprising at least two principal or power electrodes acting to control current flow in the power circuit, the conductivity between the principal electrodes being controlled by a separate control electrode within the switch or by a signal in the power electrodes, whereby the conductivity of the power circuit is controlled without movement of mechanical elements within the switch. Included within this definition are electronic tubes, transistors and like devices.

SUMMARY OF THE INVENTION

The invention incorporates several interrelated improvements in a single or multiple gap EDM power supply, both with respect to minimizing failure in the several different gap cutting circuits and with regard to providing separate immediate and reliable indication of failure in the components. The system for triggering the switches includes a means for insuring continued and uninterrupted operation of the gap circuits in which no actual component failure has occurred.

BRIEF DESCRIPTION OF THE DRAWING

This invention will be better understood and advantages and features thereof will become apparent from the following description when read in conjunction with the drawing wherein there is included a combined schematic and diagrammatic showing of the invention.

DESCRIPTION OF THE PREFERRED EMBODIMENT

The drawing shows a common DC power supply 10 and and a plurality of electronic switches shown as transistors 12 and 14. The present embodiment will be illustrated as a single gap 16 set-up, although by straightforward increase of the power supply magnitude and the number of switching components it may be extended to two or more separate gaps operating from the same common DC power supply or from a like plurality of separate DC power supplies. The gap 16 has its tool electrode connected to the positive terminal of the DC source 10 through a diode 20 or 36 and a resistor 22 or 38. An indicating means, such as an indicator light 24, is included in a shunt network for the diode 20 with the shunt network further including a diode 26 and a resistor 28. Machining power pulses are passed across the gap 16 responsive to the turn-on and turn-off of the transistors 12 and 14. This turn-on and turn-off is controlled by triggetring pulses applied to the transistor bases from a pulse generator 30, which is indicated in block diagrammatic form. The pulse generator 30 may be, for example, an astable multivibrator or an oscillator or any of a variety of other triggering pulse sources known to the electronic art. It will be noted that a diode 32 and 48 are connected in series between the base lead of the transistors 12 and 14, respectively, and the output of the pulse generator 30. The circuit for the gap 16 is completed by a shunt diode 34 which is connected to the cathode of the series diodes 20 and 36 at a point as far removed from the gap elements, that is, workpiece and electrode, as is possible within the practical design of the circuit. It is an object to make this connection of the shunt diode 34 so that as much inherent lead inductance as possible may be included. In the absence of such a connection, the possibility exists that the lead inductance without provision of an energy bypass system can cause a failure of the diode 20 or 36.

DESCRIPTION OF OPERATION

In the operation of the circuit, the pulse generator 30 is used to trigger the transistors 12 and 14 on and off in phase to provide the machining power pulses across gap 16. Each time one of the transistors 12 and 14 is turned on, current will be shunted from across the associated gap. Each time the transistor 12 and 14 are turned off, current will pass across the parallel gap. According to the conduction of transistors 12 and 14, it is thus possible to precisely control the machining pulse on-off time and accordingly to regulate and preset the magnitude of cutting current used in the machining operation. It is also possible to regulate the maximum current per pulse by controlling the number of shunt transistors being turned off at one time. As cutting progresses, failure conditions are possible in one or more of the shunt transistor circuits. In the event the transistor 12 should fail in a shorted condition, it is desirable that cutting be continued by the transistor 14 without interruption. Responsive to the failure of the transistor 12, the indicator light 24 will become lighted to provide a visual indication to the operator that the circuit needs checking and replacement of the transistor. In addition, responsive to the failure of the diode 20 or the diode 36, its associated indicator means, the light 24 or 40, will be turned on. Because of the inclusion of the base lead diodes 32 and 48, it is possible for the triggering source 30 to continue turning the transistor 14 on and off, therefore to continue cutting operation across the gap.

As has previously been indicated, the diode 34 is connected across the gap. This connection is to include as much lead inductance as is possible in the gap circuit. This has the result of keeping the gap voltage levels down to prevent premature or secondary restriking of the gap.

It will thus be seen that the invention provides an improved single or multiple gap machining circuit which possesses greatly improved reliability, and has the further capability of providing continued cutting on the gap without interruption because of failure in one or more switching components.

I claim:

1. An electrical discharge machining circuit for providing machining power pulses from a power source to a discharge gap, said circuit including a plurality of electronic switches each coupled with its principal electrodes connected in parallel with the discharge gap, and further across the power source, a triggering source selectively operable to control machining power pulses to the gap by providing pulses to the control electrodes of the switches in unison and thus selectively shunting the source of electrical power from the gap, a plurality of unidirectional current conducting devices each connected between a like principal electrode terminal of an associated switch and the gap, a like plurality of indicators, each associated with a different one of said electronic switches and connected in parallel with its respective unidirectional current conducting device for providing a failure indication responsive to failure of its respective one of the electronic switches and a like poled unidirectional current conducting device connected between the control electrode of each of said electronic switches and said triggering source for permitting the continued operation of the other switches.

2. The combination as set forth in claim 1 wherein said electronic switches comprises transistors, each of said transistors having its collector and emitter connected across the series combination of said power source and a separate, like magnitude current limiting resistor.

3. The combination as set forth in claim 2 wherein each of said indicators comprises a series combination of a light emitting device, a diode and a resistor, said combination coupled across its respective unidirectional current conducting device.

4. The combination as set forth in claim 1 wherein a separate unidirectional current conducting device is connected in shunt with the gap, said shunt device having a polarity which is blocking with respect to the gap polarity, said shunt device further being connected proximate the terminal of its said associated series device and substantially spaced from said gap, whereby a maximum length of gap lead and a substantial amount of inherent lead inductance is included between said shunt device terminals and said gap.

References Cited

UNITED STATES PATENTS

| | | | |
|---|---|---|---|
| 2,871,410 | 1/1959 | Matulaitis | 219—69 S X |
| 2,943,305 | 6/1960 | Walker | 321—14 X |
| 3,110,855 | 11/1963 | Chumakov | 337—159 X |
| 3,056,065 | 9/1962 | Porterfield | 219—69 P X |
| 3,033,971 | 5/1962 | Pfau | 219—69 C |

RALPH F. STAUBLY, Primary Examiner

U.S. Cl. X.R.

219—69 C